United States Patent
Cheng (10) Patent No.: US 11,240,160 B2
(45) Date of Patent: Feb. 1, 2022

(54) METHOD, APPARATUS, AND COMPUTER-READABLE STORAGE MEDIUM FOR NETWORK CONTROL

(71) Applicant: Alibaba Group Holding Limited, Grand Cayman (KY)

(72) Inventor: Gang Cheng, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/236,232

(22) Filed: Dec. 28, 2018

(65) Prior Publication Data
US 2020/0213239 A1 Jul. 2, 2020

(51) Int. Cl.
| | |
|---|---|
| H04L 12/825 | (2013.01) |
| H04L 12/46 | (2006.01) |
| H04L 12/743 | (2013.01) |
| H04L 12/26 | (2006.01) |
| H04L 12/707 | (2013.01) |
| H04L 12/66 | (2006.01) |

(52) U.S. Cl.
CPC .......... *H04L 47/25* (2013.01); *H04L 12/4633* (2013.01); *H04L 12/4641* (2013.01); *H04L 12/66* (2013.01); *H04L 43/16* (2013.01); *H04L 45/22* (2013.01); *H04L 45/7453* (2013.01)

(58) Field of Classification Search
None
See application file for complete search history.

(56) References Cited

U.S. PATENT DOCUMENTS

| | | | |
|---|---|---|---|
| 8,953,441 B2 * | 2/2015 | Nakil | H04L 41/0668 370/228 |
| 9,173,117 B2 | 10/2015 | Haddad et al. | |
| 9,900,224 B2 | 2/2018 | Dumitriu et al. | |
| 10,075,351 B2 | 9/2018 | Morrill | |
| 10,129,180 B2 | 11/2018 | Zhang et al. | |
| 10,268,492 B2 | 4/2019 | Suryanarayanan et al. | |
| 2010/0192214 A1 * | 7/2010 | Ohno | G06F 9/45558 726/8 |
| 2013/0223438 A1 * | 8/2013 | Tripathi | H04L 45/66 370/355 |

(Continued)

FOREIGN PATENT DOCUMENTS

| | | |
|---|---|---|
| CN | 103701928 A | 4/2014 |
| CN | 104468775 A | 3/2015 |

(Continued)

OTHER PUBLICATIONS

Translaton of International Search Report dated Mar. 27, 2020, from corresponding PCT Application No. PCT/CN2019/126630, 3 pages.

(Continued)

*Primary Examiner* — Hassan A Phillips
*Assistant Examiner* — Gautam Sharma
(74) *Attorney, Agent, or Firm* — Lee & Hayes, P.C.

(57) ABSTRACT

Apparatuses and methods comprise receiving traffic from multiple virtual machines (VMs) associated with a same identification (ID); mapping the ID into a destination Internet Protocol (IP) address; and forwarding the traffic from the multiple VMs to a first gateway instance announcing the destination IP address.

17 Claims, 6 Drawing Sheets

(56) References Cited

U.S. PATENT DOCUMENTS

| | | | | |
|---|---|---|---|---|
| 2013/0329548 A1* | 12/2013 | Nakil | H04L 41/0668 | 370/228 |
| 2014/0207968 A1* | 7/2014 | Kumar | H04L 45/38 | 709/244 |
| 2015/0043379 A1* | 2/2015 | Shimokuni | H04L 45/586 | 370/254 |
| 2015/0049638 A1* | 2/2015 | Hyoudou | H04L 45/38 | 370/254 |
| 2015/0063353 A1* | 3/2015 | Kapadia | H04L 45/745 | 370/392 |
| 2015/0124612 A1* | 5/2015 | Schlansker | H04L 47/41 | 370/235 |
| 2015/0200847 A1* | 7/2015 | Gourlay | H04L 49/70 | 370/392 |
| 2015/0281059 A1* | 10/2015 | Xiao | H04L 45/74 | 709/238 |
| 2015/0358232 A1* | 12/2015 | Chen | H04L 49/3009 | 370/392 |
| 2015/0363221 A1* | 12/2015 | Terayama | G06F 9/45558 | 718/1 |
| 2015/0365313 A1* | 12/2015 | Chiba | H04L 61/2592 | 370/254 |
| 2016/0094514 A1* | 3/2016 | Hsu | H04L 67/10 | 370/392 |
| 2016/0105392 A1* | 4/2016 | Thakkar | H04L 61/6022 | 709/220 |
| 2016/0203024 A1* | 7/2016 | Choi | G06F 9/5027 | 718/1 |
| 2016/0218975 A1* | 7/2016 | Hyoudou | H04L 45/7453 | |
| 2016/0234298 A1* | 8/2016 | Takeda | H04L 69/165 | |
| 2016/0285826 A1 | 9/2016 | Itskin et al. | | |
| 2016/0359913 A1* | 12/2016 | Gupta | G06F 16/248 | |
| 2016/0381015 A1* | 12/2016 | Ravinutala | H04W 80/02 | 726/7 |
| 2017/0034051 A1* | 2/2017 | Chanda | H04L 45/586 | |
| 2017/0070387 A1 | 3/2017 | Rao et al. | | |
| 2017/0155599 A1 | 6/2017 | Vobbilisetty et al. | | |
| 2017/0163442 A1* | 6/2017 | Shen | H04L 12/4633 | |
| 2017/0214549 A1* | 7/2017 | Yoshino | H04L 12/4641 | |
| 2017/0310586 A1* | 10/2017 | Lin | H04L 12/6418 | |
| 2017/0310635 A1* | 10/2017 | Yang | H04L 67/10 | |
| 2018/0048537 A1* | 2/2018 | Gaikwad | H04L 41/0896 | |
| 2018/0121226 A1* | 5/2018 | Liu | G06F 9/45558 | |
| 2018/0173557 A1 | 6/2018 | Nakil et al. | | |
| 2018/0219775 A1* | 8/2018 | Jiang | H04L 45/74 | |
| 2019/0065265 A1* | 2/2019 | Wang | H04L 43/0894 | |
| 2019/0149464 A1 | 5/2019 | Bajaj et al. | | |

FOREIGN PATENT DOCUMENTS

| | | |
|---|---|---|
| CN | 106953943 A | 7/2017 |
| WO | WO2019135249 A1 | 7/2019 |

OTHER PUBLICATIONS

Translaton of Written Opinion dated Mar. 27, 2020, from corresponding PCT Application No. PCT/CN2019/126620, 3 pages.

* cited by examiner

FROM 312

IF THE FIRST GATEWAY INSTANCE IS DOWN, REROUTE THE TRAFFIC FROM MULTIPLE VMs OF THE SAME/SINGLE USER TO A SECOND GATEWAY INSTANCE
314

IF THE SECOND GATEWAY INSTANCE IS ALSO DOWN, REROUTE THE TRAFFIC FROM MULTIPLE VMs OF THE SAME/SINGLE USER TO A THIRD GATEWAY INSTANCE
316

IF ALL GATEWAY INSTANCES UNDER A LEVEL-N NODE ARE DOWN, REROUTE THE TRAFFIC FROM MULTIPLE VMs OF THE SAME/SINGLE USER TO A GATEWAY INSTANCE SHARING A SAME LEVEL-(N-1) NODE WITH THE FIRST GATEWAY INSTANCE
318

METHOD, APPARATUS, AND COMPUTER-READABLE STORAGE MEDIUM FOR NETWORK CONTROL

BACKGROUND

A cloud computing architecture may be built up for multiple tenants. Each tenant is assigned its own network identification (tenant ID). Traditionally, virtual local area networks (VLANs) are used to isolate tenants in a cloud computing environment. However, VLAN specifications only allow for up to 4,096 network IDs to be assigned, which may not be sufficient for a large cloud computing environment.

Virtual Extensible Local Area Network (VXLAN) is an encapsulation protocol that enables the cloud computing environment while logically isolating tenants. The primary goal of VXLAN is to extend the virtual VLAN address space by adding a 24-bit segment ID and increasing the number of available IDs to 16 million. VXLAN also allows a server to instruct network switches where to send packets. Each switch has software to receive and process instructions from the server. Packet-moving decisions and network traffic flow may be programmed for individual switches.

VXLAN is also referred to as an overlay technology because it allows stretching Layer 2 connections over an intervening Layer 3 network by encapsulating (tunneling) data into a VXLAN packet. Devices that support VXLANs are called virtual tunnel endpoints (VTEPs), which encapsulate and de-encapsulate VXLAN traffic. The migration of virtual machines is enabled between servers that exist in separate Layer 2 domains by tunneling the traffic over Layer 3 networks. This functionality allows the user to dynamically allocate resources within or between data centers without being constrained by Layer 2 boundaries or being forced to create large or geographically stretched Layer 2 domains. Using routing protocols to connect Layer 2 domains also allows load-balance of the traffic to ensure that the user gets the best use of available bandwidth.

Each virtual private cloud (VPC) user has a unique VPC ID, and different users have different VPC IDs. Therefore, network traffics of different users may be isolated and secured. A user may have more than one virtual machines (VMs) hosted on different servers. A service provider needs to ensure that each VPC user does not consume resource such as bandwidth or dataflow more than purchased.

In a gateway cluster, each gateway instance announces a range of Virtual Internet protocol (VIP) addresses to the network so that a packet with a destination IP address may be forwarded to the gateway instance based on in which range of VIP addresses the destination VIP address falls. Due to network load balancing, the traffic from a single VPC is distributed among different gateway instances. When one gateway instance is down, the packet may be randomly rerouted to a different gateway instance in the gateway cluster. Therefore, how to perform the traffic limitation of the same user becomes a problem.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Apparatuses and methods discussed herein are directed to improving traffic control of cloud service, and more specifically to throttling traffic of multiple VMs of a same/single user.

Apparatuses and methods discussed herein may be usable to design a highly scalable and available solution in which the total resource occupied by multiple VMs belonging to a same/single user is limited based on how much resource the user has purchased. Throughout the context, the user may not be limited to a person. The user may be an entity who purchases resources, such as a company, an institution, an organization, a human person, etc. Moreover, in case of a single or multiple gateway instances failure, the traffic may be rerouted, and thus the availability of the gateway cluster is improved.

Traffic from multiple VMs associated with a same ID may be received. Traffic may refer to the amount of data moving across a network at a given point of time. Network data in networks may be encapsulated in packets, which provide the load in the network. The ID may be mapped into a destination IP address. The traffic from the multiple VMs may be encapsulated using the destination IP address. The traffic from the multiple VMs may be forwarded to a first gateway instance announcing the destination IP address. The traffic from the multiple VMs may be monitored by determining whether a traffic indicator exceeds a threshold. Upon determining that the traffic indicator exceeds the threshold, the traffic from the multiple VMs may be throttled.

The traffic indicator may indicate a bandwidth occupied by the traffic of the multiple VMs.

The traffic indicator may indicate a dataflow of the multiple VMs.

Mapping the ID into the destination IP address may include hashing the ID into a whole IP address range of a gateway cluster. The gateway cluster may include the first gateway instance.

The whole IP address range may include a plurality of IP address sub-ranges. The gateway cluster may include a plurality of gateway instances. Each gateway instance of the plurality of gateway instance may announce an IP sub-range of the plurality of IP address sub-ranges.

Whether the first gateway instance is down may be determined. For example, the gateway instance may fail, crash, be busy, etc. If the attempt of routing the traffic to the first gateway instance is unsuccessful, this indicates that the first gateway instance may be down. Upon determining that the first gateway instance is down, the traffic from the multiple VMs may be rerouted to a second gateway instance in the gateway cluster.

Figure 1:
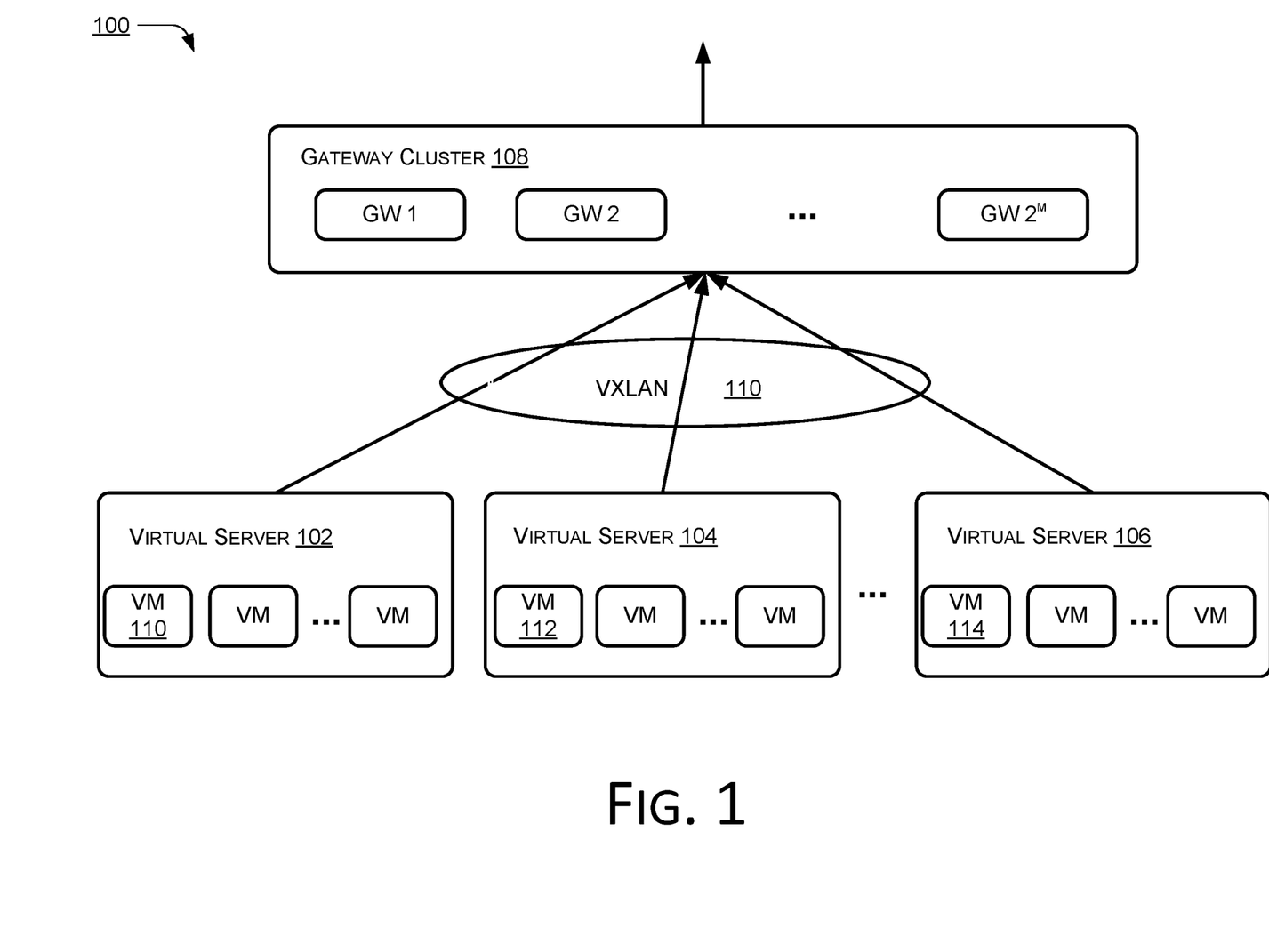
FIG. 1 illustrates an example block diagram of multiple VMs of the same/single user hosted on different servers.

FIG. 1 illustrates an example block diagram 100 showing multiple VMs of the same/single user hosted on different servers. Referring to FIG. 1, each of the three virtual servers 102, 104, and 106 shown in this example, hosts multiple virtual machines (VMs). Though FIG. 1 shows three servers, other numbers of servers may be provided. Each of the three virtual servers 102, 104, and 106 may serve a plurality of VMs. Each of the virtual servers 102, 104, and 106 may route traffic from different VMs to a gateway cluster 108 through the VXLAN 110. A user may have more than one VMs hosted on different servers. For example, the VM 110 hosted on the virtual server 102, the VM 112 hosted on the virtual server 104, and the VM 114 hosted on the virtual server 106 may belong to the same/single user with a single user/tenant ID. The user may be a VPC user, and the user/tenant ID may be a VPC ID.

Figure 2:
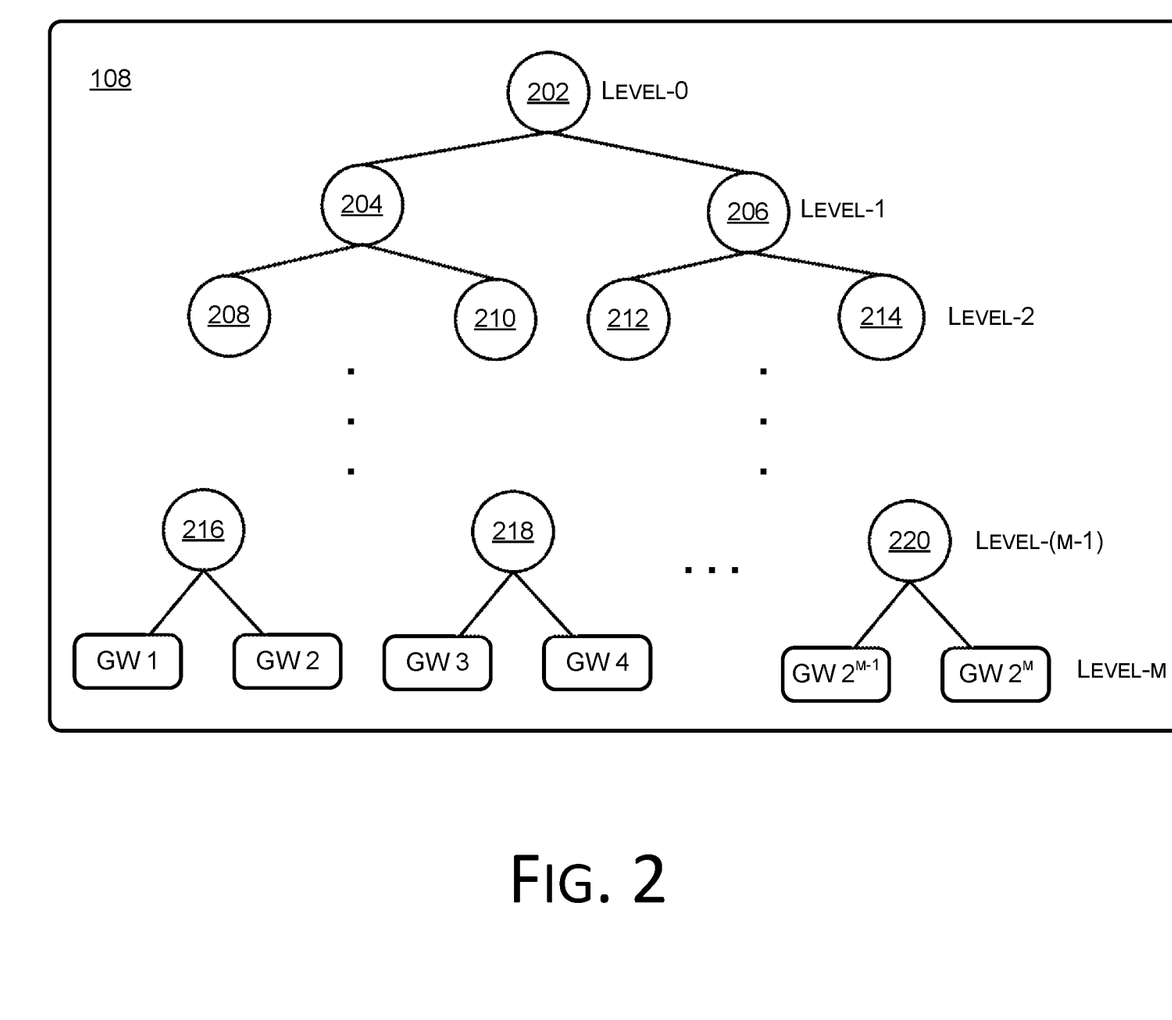
FIG. 2 illustrates an example diagram of a gateway cluster.

FIG. 2 illustrates an example diagram of the gateway cluster 108. The total number of gateway instances in the gateway cluster 108 may be of any positive value based on hardware and/or software configurations associated with the gateway cluster. By way of example and not limitation, FIG. 2 shows the total number of gateway instances in the gateway cluster 108 to be a power of 2, for example, $2^m$, where the number m may be an integer. Gateway instances, GW 1, GW 2, GW 3, GW 4, . . . GW $2^{m-1}$, and GW $2^m$ are shown in this example, each of which may announce a part of the whole VIP address range. Though six gateway instances are shown in this example, other numbers of gateway instances may be provided. The structure of the (m+1) level full binary tree may be described as follows.

A Level-0 root node may be provided. The Level-0 root node may have a corresponding IP address range which is the whole VIP address range of $[1, 2^k]$. The Level-0 root node 202 may be split into two Level-1 nodes 204 and 206. The left child Level-1 node 204 may have a corresponding IP address range of $[1, 2^{k-1}]$, while the right child Level-1 node 206 may have a corresponding IP address range of $[2^{k-1}+1, 2^k]$. The number k may be an integer, and $2^k$ may represent the IP address space to be accessed.

The Level-1 node 204 may be split into two Level-2 nodes 208 and 210. The Level-1 node 206 may be split into two Level-2 nodes 212 and 214. The Level-2 node 208 may have a corresponding IP address range of $[1, 2^{k-2}]$. The Level-2 node 210 may have a corresponding IP address range of $[2^{k-2}+1, 2^{k-1}]$. The Level-2 node 212 may have a corresponding IP address range of $[2^{k-1}+1, 2^{k-1}+2^{k-2}]$. The Level-2 node 214 may have a corresponding IP address range of $[2^{k-1}+2^{k-2}+1, 2^k]$. The node splitting and the sub-range dividing may be repeated in an iterative manner.

Each Level-(m−1) node may be split into two Level-m nodes. The Level-(m−1) node 216 may be split into two Level-m nodes GW 1 and GW 2. The Level-(m−1) node 218 may be split into two Level-m nodes GW 3 and GW 4. The Level-(m−1) node 220 may be split into two Level-m nodes GW $2^{m-1}$ and GW $2^m$. Each of the gateway instances, GW 1, GW 2, GW 3, GW 4, . . . , GW $2^{m-1}$, and GW $2^m$, may be a leaf node of the binary tree. The gateway instance GW 1 may have a corresponding IP address range of $[1, 2^{k-m}]$. The gateway instance GW 2 may have a corresponding IP address range of $[2^{k-m}+1, 2^{k-m+1}]$. The gateway instance GW $2^m$ may have a corresponding IP address range of $[2^{k-1}+2^{k-2}+ \ldots +2^{k-m}+1, 2^k]$.

Each of the gateway instances, GW 1, GW 2, GW 3, GW 4, . . . , GW $2^{m-1}$, and GW $2^m$, may have a single path to reach the Level-0 root node 202. In such a path, there are (m+1) nodes, including the gateway instance node, representing (m+1) IP address ranges. Hence, each of the gateway instances, GW 1, GW 2, GW 3, GW 4, . . . , GW $2^{m-1}$, and GW $2^m$, may announce (m+1) IP address ranges to the network. For instance, the gateway instance GW 1 may announce (m+1) address ranges $[1, 2^{k-m}]$, $[1, 2^{k-m+1}]$, $[1, 2^{k-m+2}]$, . . . , $[1, 2^k]$.

In the above gateway cluster 108, m is an integer and may be selected based on the number of the gateway instances. K is an integer and may be selected based on the IP address range to be accessed. Because m and k may be selected based on actual needs, the gateway cluster may be scalable and expandable. Moreover, in case of failure of one or more gateway instances, the traffic may be rerouted to a gateway instance under the same upper-level parent node. Thus, the availability of the gateway cluster 108 may be improved.

The above manner of dividing the IP address range or splitting nodes is merely an example, and there may be other ways of division/splitting, for example, an upper-level node may be split into three, four, or other number of lower-level nodes.

Figure 3A:
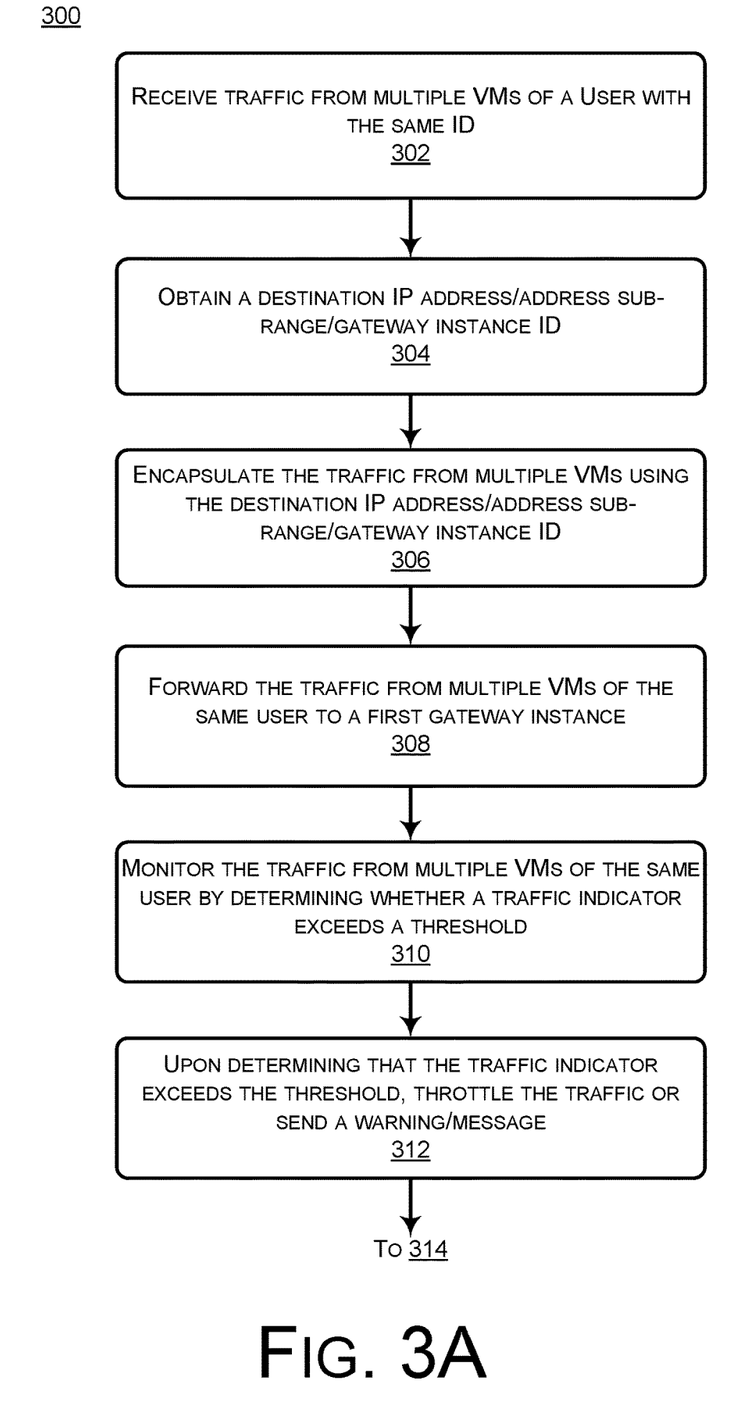
FIG. 3A illustrates an example process for throttling traffic from multiple VMs of a same/single user.

FIG. 3A illustrates an example process 300 for throttling traffic from multiple VMs of a same/single user.

At block 302, one or more servers may receive traffic from multiple VMs of the same/single user, for example, a VPC user with the same VPC ID. For example, referring to FIG. 1, the server 102 may receive traffic from the VM 110, the server 104 may receive traffic from the VM 112, and the server 106 may receive traffic from the VM 114, where the VMs 110, 112, and 114 may be associated with the same ID. Though three VMs are used here, other numbers of VMs may be provided.

At block 304, the one or more servers may obtain a destination IP address for the traffic by mapping the ID, for example, the VPC ID, into the whole VIP address range of the gateway cluster 108. Also referring to FIG. 1, the server 102 may obtain the destination IP address for the traffic from the VM 110. The server 104 may obtain the destination IP address for the traffic from the VM 112. The server 106 may obtain the destination IP address for the traffic from the VM 114. Because VMs 110, 112, and 114 are associated with the same ID, the destination IP address for the traffic from VMs 110, 112, and 114 may be the same. Though three VMs are used here, other numbers of VMs may be provided.

The mapping may be performed by hashing the ID into the whole VIP address range of the gateway cluster 108. Other methods of mapping may also be used as long as the same ID corresponds to or is mapped to the same destination IP address after the mapping. For example, a table may be used to keep the corresponding relationship between IDs and destination IP addresses.

As an alternative embodiment, the same ID may be mapped to the same address sub-range served by a same gateway instance. In that case, the ID may be mapped into one of a group of address sub-ranges, where each address sub-range correspond to a gateway instance.

As another alternative embodiment, the same ID may be mapped to the same gateway address or the same gateway instance ID. In that case, the ID may be mapped into one of a group of gateway instance IDs, where each gateway instance ID correspond to a gateway instance. Other methods of mapping between IDs and gateway instances may be used as long as the traffic from different VMs associated with the same ID may go through the same gateway instance such that the gateway instance may be able to monitor and throttle/control the traffic of the same user.

By way of example and not limitation, the IDs may be mapped to a group of one or more gateway instances which can serve and handle the traffic of the same user (i.e., traffic having the same user ID) using one of the mapping methods (for example, hashing, etc.) described in the foregoing description, and one of the one or more gateway instances may be selected to serve and handle the traffic of the same user in a rotating manner.

Alternatively, after the traffic of the same ID is mapped into a determinative group of one or more gateway instances, one of the one or more gateway instances within this particular group may be randomly selected to serve and handle the traffic of the same user.

Using a determinative group of one or more gateway instances to serve and handle all the traffic having a same ID (e.g., a same user ID) helps alleviating the excessive workload that a single gateway instance may handle for the traffic coming from a same user, and improves the speed of transmitting and handling the traffic of the same user through the gateway, for example. This is especially true when the user is a large entity such as an enterprise, an institution, etc., in which the amount of traffic coming from the user is normally large at certain period of time.

In implementations, whether traffic of a same user is mapped into a determinative group of gateway instances or a single gateway instance may depend on the amount of bandwidth that this user purchases, or the amount of traffic that the user is sending and/or receiving, etc. For example, a group of gateway instances may be used and mapped into if the amount of bandwidth that this user purchases or the amount of traffic that the user is sending and/or receiving is larger than a certain threshold (such as 100 MB, 500 GB, 1 GB, etc.)

At block 306, the traffic from multiple VMs of the same/single user may be encapsulated using the destination IP address obtained at block 304. Packets carried in the traffic may be encapsulated based on tunneling protocols, for example, VXLAN/NvGRE/Genve. Referring to FIG. 1, the server 102 may encapsulate traffic from the VM 110, the server 104 may encapsulate traffic from the VM 112, and the server 106 may encapsulate traffic from the VM 114. Because the VMs 110, 112, and 114 are associated with the same ID, and the same ID may be mapped to the same destination IP address as discussed above, the traffic from the same user may reach the same gateway instance in the gateway cluster 108. Traffic from different VMs associated with different IDs may be routed to different gateway instances.

As an alternative embodiment, the same ID may be mapped to the same address sub-range served by a same gateway instance. In that case, the traffic from multiple VMs of the same/single user may be encapsulated using the address sub-range.

As another alternative embodiment, the same ID may be mapped to the same gateway address or the same gateway instance ID. In that case, the traffic from multiple VMs of the same/single user may be encapsulated using the same gateway instance ID.

At block 308, the traffic from multiple VMs of the same/single user may be forwarded to a first gateway instance GW 1 announcing the destination IP address or an IP address sub-range including the destination IP address in the gateway cluster 108. Also referring to FIG. 1, the server 102 may forward the traffic from the VM 110 to the first gateway instance GW 1, the server 104 may forward the traffic from the VM 112 to the first gateway instance GW 1, and the server 106 may forward the traffic from the VM 114 to the first gateway instance GW 1. Therefore, the traffic from multiple VMs of the same/single user may reach the same gateway instance in the gateway cluster 108.

As an alternative embodiment, the same ID may be mapped to the same address sub-range served by the same gateway instance. In that case, the ID may be mapped into one of a group of address sub-ranges, where each address sub-range correspond to a gateway instance. The traffic from multiple VMs of the same/single user may be forwarded to the first gateway instance GW 1 announcing the address sub-range. Also referring to FIG. 1, the server 102 may forward the traffic from the VM 110 to the first gateway instance GW 1 announcing the address sub-range, the server 104 may forward the traffic from the VM 112 to the first gateway instance GW 1 announcing the same address sub-range, and the server 106 may forward the traffic from the VM 114 to the first gateway instance GW 1 announcing the same address sub-range. Therefore, the traffic from multiple VMs of the same/single user may reach the same gateway instance in the gateway cluster 108.

As another alternative embodiment, the same ID may be mapped to the same gateway address or the same gateway instance ID. In that case, the ID may be mapped into one of a group of gateway instance ID, where each gateway instance ID correspond to a gateway instance. The traffic from multiple VMs of the same/single user may be forwarded to the first gateway instance GW 1 associated with the gateway instance ID. Also referring to FIG. 1, the server 102 may forward the traffic from the VM 110 to the first gateway instance GW 1 associated with the gateway instance ID, the server 104 may forward the traffic from the VM 112 to the first gateway instance GW 1 associated with the same gateway instance ID, and the server 106 may forward the traffic from the VM 114 to the first gateway instance GW 1 associated with the same gateway instance ID. Therefore, the traffic from multiple VMs of the same/single user may reach the same gateway instance in the gateway cluster 108.

At block 310, the first gateway instance GW 1 may monitor the traffic from multiple VMs of the same/single user by determining whether a traffic indicator exceeds a threshold. The gateway instances may be programmed to monitor the traffic indicator, which may indicate the bandwidth or the dataflow consumed by the traffic of the user. The traffic indicator may also be other suitable parameters representing resources consumed by the user. The threshold may be set based on how much resource the user has purchased.

At block 312, the first gateway instance GW 1 may throttle the traffic of multiple VMs of the same/single user upon determining that the traffic indicator exceeds the threshold. For example, a user may have purchased 4 GHz bandwidth. When the bandwidth occupied by the traffic of multiple VMs of the user exceeds 4 GHz, the first gateway instance GW 1 may throttle the traffic of multiple VMs of the same/single user such that the traffic of multiple VMs of the same/single user occupies no more than 4 GHz bandwidth. Also, the first gateway instance GW 1 may send a warning or a message to the user indicating that the traffic of the user is approaching or has reached the purchased bandwidth before clipping or throttling the traffic of the user. In response to the warning or the message, the user may choose to purchase more resources or accept clipping or throttling of the traffic.

In the above process 300, all traffic associated with the same ID may be routed to a single gateway instance to facilitate the measurement of the amount of traffic consumed by the same user. Also, traffic of the same user may be routed to one or more (or any one of these one or more) gateway instances that are selected in a determinative manner, rather than randomly, and the amount of the traffic of the same user may be measured/throttled by these one or more gateway instances. By way of example and not limitation, the IDs may be mapped to a group of one or more gateway instances which can serve and handle the traffic of the same user (i.e., traffic having the same user ID) using one of the mapping methods (for example, hashing, etc.) described in the foregoing description, and one of the one or more gateway instances may be selected to serve and handle the traffic of the same user in a rotating manner.

Alternatively, after the traffic of the same ID is mapped into a determinative group of one or more gateway instances, one of the one or more gateway instances within this particular group may be randomly selected to serve and handle the traffic of the same user.

Using a determinative group of one or more gateway instances to serve and handle all the traffic having a same ID (e.g., a same user ID) helps alleviating the excessive workload that a single gateway instance may handle for the traffic coming from a same user, and improves the speed of transmitting and handling the traffic of the same user through the gateway, for example. This is especially true when the user is a large entity such as an enterprise, an institution, etc., in which the amount of traffic coming from the user is normally large at certain period of time.

In implementations, whether traffic of a same user is mapped into a determinative group of gateway instances or a single gateway instance may depend on the amount of bandwidth that this user purchases, or the amount of traffic that the user is sending and/or receiving, etc. For example, a group of gateway instances may be used and mapped into if the amount of bandwidth that this user purchases or the amount of traffic that the user is sending and/or receiving is larger than a certain threshold (such as 100 MB, 500 GB, 1 GB, etc.)

Figure 3B:
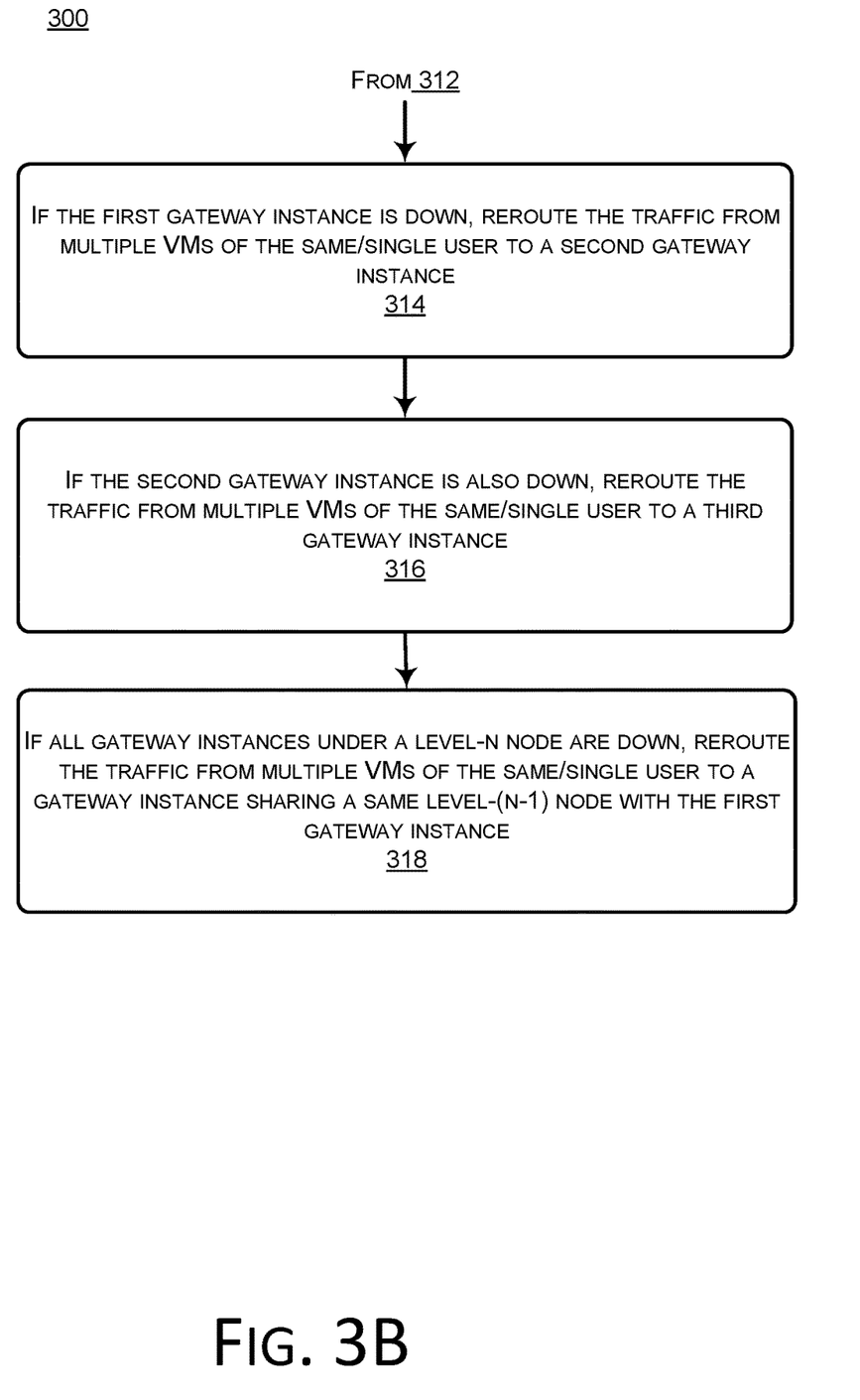
FIG. 3B illustrates an example process for rerouting traffic when one or more gateway instances are down.

FIG. 3B illustrates an example process for rerouting traffic when one or more gateway instances are down. Rerouting of the traffic illustrated in FIG. 3B may follow block 312 of FIG. 3A.

At block 314, if the first gateway instance GW 1 is down, the traffic from multiple VMs of the same/single user may be rerouted to a second gateway instance GW 2. For example, if the attempt of routing the traffic to the first gateway instance GW 1 is unsuccessful, indicating that the first gateway instance GW 1 may be down, the traffic may be rerouted to the second gateway instance GW 2. If the first gateway instance GW 1 is a Level-m node, the second gateway instance GW 2 may share the same Level-(m−1) node with the first gateway instance GW 1.

At block 316, if the second gateway instance GW 2 is also down, the traffic from multiple VMs of the same/single user may be rerouted to a third gateway instance GW 3. For example, if the attempt of rerouting the traffic to the second gateway instance GW 2 is unsuccessful, indicating that the second gateway instance GW 2 is also down, the traffic may be rerouted to the third gateway instance GW 3. The third gateway instance GW 3 may share the same Level-(m−2) node with the first gateway instance GW 1.

At block 318, if all gateway instances under a Level-n node are down, the traffic from multiple VMs of the same/single user may be rerouted to the closest gateway instance sharing the same Level-(n−1) node with the first gateway instance GW 1. For example, if all previous attempts of rerouting the traffic to gateway instances under a Level-n node are unsuccessful, indicating that all gateway instances under the Level-n node are down, the traffic may be rerouted to the gateway instance sharing the same Level-(n−1) node with the first gateway instance GW 1, where $1 \leq n \leq m-1$.

As shown above, the availability and the fault-tolerant ability of the gateway cluster 108 may be improved while achieving the traffic throttling for the network traffic from multiple VMs of the same/single user.

Figure 4:
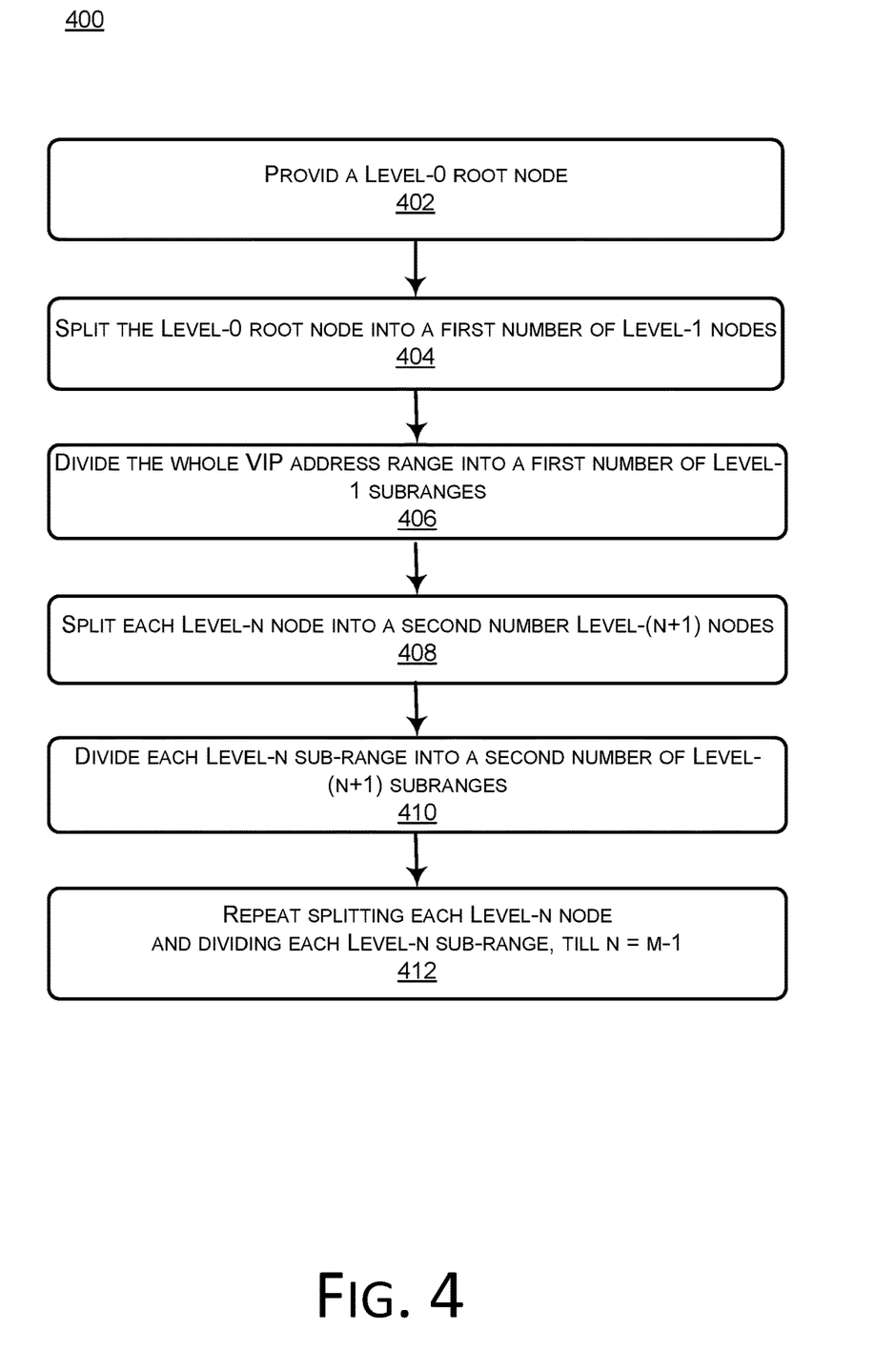
FIG. 4 illustrates an example process for establishing the gateway cluster.

FIG. 4 illustrates an example process 400 for establishing the gateway cluster 108.

At block 402, a Level-0 root node, which may correspond to the whole VIP address range of the gateway cluster 108, may be provided. For example, the gateway cluster 108 may be constructed based on a (m+1) level full binary tree, and each gateway instance may be a leaf node. Also, the gateway cluster 108 may be constructed based on a binary tree, a ternary tree, a quaternary tree, other tree structures, or any combination thereof.

At block 404, the Level-0 root node may be split into a first predetermined number of Level-1 nodes. For example, if the gateway cluster 108 is constructed based on a binary tree, the first predetermined number may be two. In that case, the Level-0 root node may be split into two Level-1 nodes. If the gateway cluster 108 is constructed based on a ternary tree or a quaternary tree, the first predetermined number may be three or four. In such cases, the Level-0 root node may be split into three or four Level-1 nodes. Also, other tree structures or any combination of different tree structures may be used.

At block 406, the whole VIP address range may be divided into the first predetermined number of Level-1 sub-ranges. For example, if the gateway cluster 108 is constructed based on a binary tree, the first predetermined number may be two. In that case, the whole VIP address range may be divided into two Level-1 sub-ranges. If the gateway cluster 108 is constructed based on a ternary tree or a quaternary tree, the first predetermined number may be three or four. In such cases, the whole VIP address range may be divided into three or four Level-1 sub-ranges. Also, other tree structures or any combination of different tree structures may be used.

At block 408, each Level-n node may be split into a second predetermined number of Level-(n+1) nodes. For example, if the gateway cluster 108 is constructed based on a binary tree, the second predetermined number may be two. In that case, the Level-n node may be split into two Level-(n+1) nodes. If the gateway cluster 108 is constructed based on a ternary tree or a quaternary tree, the second predetermined number may be three or four. In such cases, each Level-n node may be split into three or four Level-(n+1) nodes. Also, other tree structures or any combination of different tree structures may be used.

At block 410, and each Level-n sub-range may be divided into the second predetermined number of Level-(n+1) sub-ranges. For example, if the gateway cluster 108 is constructed based on a binary tree, the first predetermined number may be two. In that case, each Level-n sub-range may be divided into two Level-(n+1) sub-ranges. If the gateway cluster 108 is constructed based on a ternary tree or a quaternary tree, the first predetermined number may be three or four. In such cases, each Level-n sub-range may be divided into three or four Level-(n+1) sub-ranges. Also, other tree structures or any combination of different tree structures may be used.

At block 412, splitting each Level-n node and dividing each Level-n sub-range may be repeated in an iterative manner, with n=1 as an initial value, and n+1 acting as a value for a next iteration, till n=m−1. N and m may be integers, where $1 \leq n \leq m-1$. For example, if the gateway cluster 108 is constructed based on a binary tree, $2^m$ may be a total number of gateway instances. If the gateway cluster 108 is constructed based on a ternary tree or a quaternary tree, $3^m$ or $4^m$ may be a total number of gateway instances. Also, other tree structures or any combination of different tree structures may be used.

Figure 5:
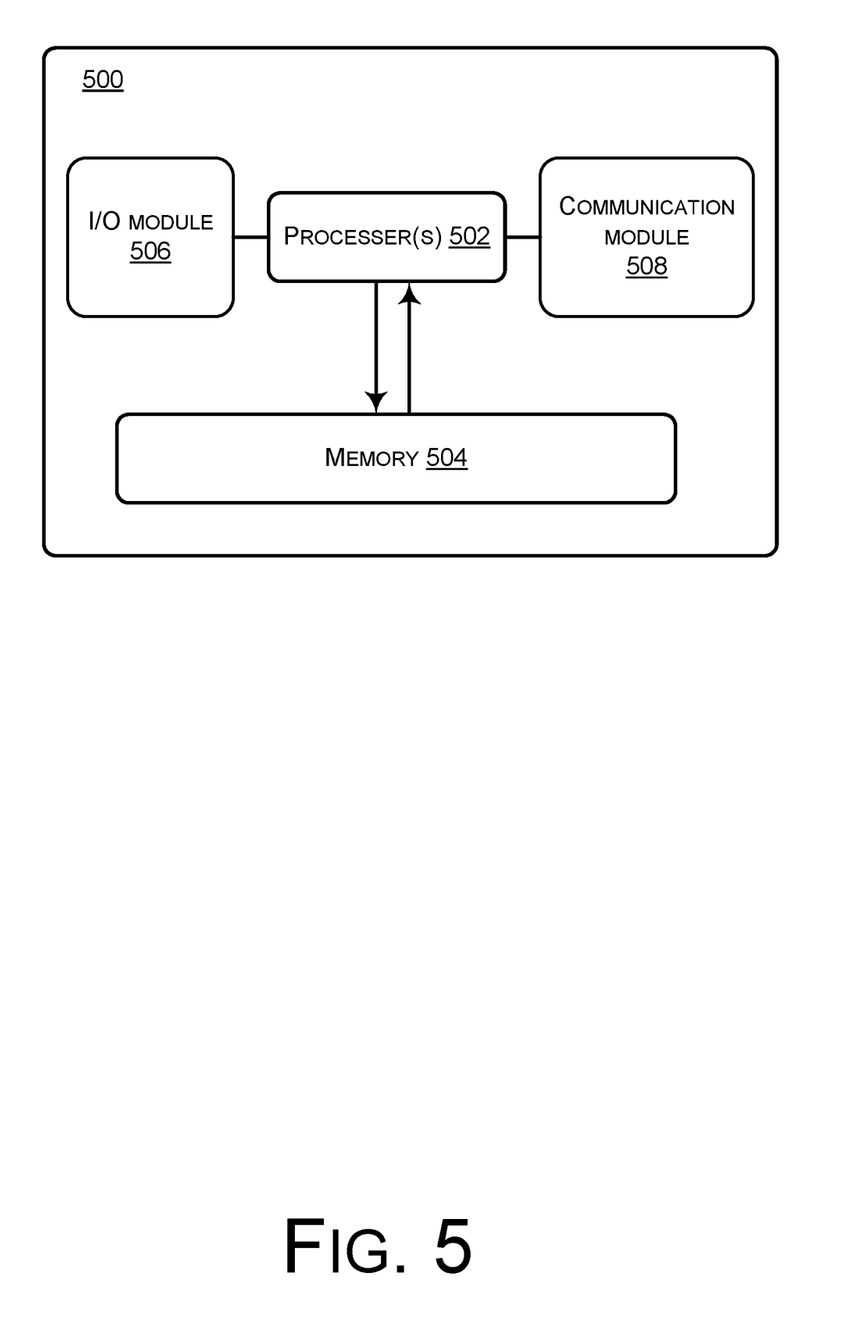
FIG. 5 illustrates an example block diagrams of an apparatus for throttling traffic from multiple VMs of the same/single user.

FIG. 5 illustrates an example block diagrams of an apparatus for throttling traffic from multiple VMs of the same/single user.

FIG. 5 is only one example of an apparatus 500 and is not intended to suggest any limitation as to the scope of use or functionality of any computing device utilized to perform the processes and/or procedures described above. Other well-known computing devices, apparatuses, environments and/or configurations that may be suitable for use with the embodiments include, but are not limited to, driver/passenger computers, server computers, hand-held or laptop devices, multiprocessor apparatuses, microprocessor-based apparatuses, set-top boxes, game consoles, programmable consumer electronics, network PCs, minicomputers, mainframe computers, distributed computing environments that include any of the above apparatuses or devices, implementations using field programmable gate arrays ("FPGAs") and application specific integrated circuits ("ASICs"), and/or the like.

The apparatus 500 may include one or more processors 502 and memory 504 communicatively coupled to the processor(s) 502. The processor(s) 502 may execute one or more modules and/or processes to cause the processor(s) 502 to perform a variety of functions. In some embodiments, the processor(s) 502 may include a central processing unit (CPU), a graphics processing unit (GPU), both CPU and GPU, or other processing units or components known in the art. Additionally, each of the processor(s) 502 may possess its own local memory, which also may store program modules, program data, and/or one or more operating apparatuses.

Depending on the exact configuration and type of the apparatus 500, the memory 504 may be volatile, such as RAM, non-volatile, such as ROM, flash memory, miniature hard drive, memory card, and the like, or some combination thereof. The memory 504 may include computer-executable instructions that are executable by the processor(s) 502, when executed by the processor(s) 502, cause the processor (s) 502 to implement systems and processes described with reference to FIGS. 1-4.

The apparatus 500 may additionally include an input/output (I/O) interface 506 for receiving and outputting data. The apparatus 500 may also include a communication module 508 allowing the apparatus 500 to communicate with other devices (not shown) over a network (not shown). The network may include the Internet, wired media such as a wired network or direct-wired connections, and wireless media such as acoustic, radio frequency (RF), infrared, and other wireless media.

With systems and processes discussed herein, a high available and fault-tolerant solution may be provided where traffic throttling for the network traffic from the multiple VMs of a same/single user may be achieved.

Though systems and processes are discussed herein with regard to VMs and VPC user/tenant, processes and systems discussed herein may be used in any suitable scenarios where it is necessary to monitor and control traffic from different devices of the same/single user.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Example Clauses

Clause 1. A method, comprising: receiving traffic from multiple virtual machines (VMs) associated with a same identification (ID); mapping the ID into a destination Internet Protocol (IP) address; and forwarding the traffic from the multiple VMs to a first gateway instance announcing the destination IP address.

Clause 2. The method of clause 1, wherein before forwarding the traffic from the multiple VMs to a first gateway instance, the method further comprises encapsulating the traffic from the multiple VMs using the destination IP address.

Clause 3. The method of clause 1, further comprising: monitoring the traffic from the multiple VMs by determining whether a traffic indicator exceeds a threshold; and upon determining that the traffic indicator exceeds the threshold, throttling the traffic from the multiple VMs.

Clause 4. The method of clause 3, wherein the traffic indicator indicates a bandwidth occupied by the traffic of the multiple VMs.

Clause 5. The method of clause 3, wherein the traffic indicator indicates a dataflow of the multiple VMs.

Clause 6. The method of clause 1, wherein mapping the ID into the destination IP address includes hashing the ID into a whole IP address range of a gateway cluster, the gateway cluster including a the first gateway instance.

Clause 7. The method of clause 6, wherein the whole IP address range includes a plurality of IP address sub-ranges, the gateway cluster including a plurality of gateway instances, each gateway instance of the plurality of gateway instances announcing an IP sub-range of the plurality of IP address sub-ranges.

Clause 8. The method of clause 7, further comprising: determining whether the first gateway instance is down; and upon determining that the first gateway instance is down, rerouting the traffic from the multiple VMs to a second gateway instance in the gateway cluster.

Clause 9. An apparatus, comprising: one or more processors; a memory coupled to the one or more processors, the memory storing computer-readable instructions executable by the one or more processors, that when executed by the one or more processors, cause the one or more processors to perform operations including: receiving traffic from multiple virtual machines (VMs) associated with a same identification (ID); mapping the ID into a destination Internet Protocol (IP) address; and forwarding the traffic from the multiple VMs to a first gateway instance announcing the destination IP address.

Clause 10. The apparatus of clause 9, wherein before forwarding the traffic from the multiple VMs to a first gateway instance, the operations further comprise encapsulating the traffic from the multiple VMs using the destination IP address.

Clause 11. The apparatus of clause 9, wherein the operations further comprise: monitoring the traffic from the multiple VMs by determining whether a traffic indicator exceeds a threshold; and upon determining that the traffic indicator exceeds the threshold, throttling the traffic from the multiple VMs.

Clause 12. The apparatus of clause 11, wherein the traffic indicator indicates a bandwidth occupied by the traffic of the multiple VMs.

Clause 13. The apparatus of clause 11, wherein the traffic indicator indicates a dataflow of the multiple VMs.

Clause 14. The apparatus of clause 9, wherein mapping the ID into the destination IP address includes hashing the ID into a whole IP address range of a gateway cluster, the gateway cluster including the first gateway instance.

Clause 15. The apparatus of clause 14, wherein the whole IP address range includes a plurality of IP address sub-ranges, the gateway cluster including a plurality of gateway instances, each gateway instance of the plurality of gateway instances announcing an IP sub-range of the plurality of IP address sub-ranges.

Clause 16. The apparatus of clause 15, wherein the operations further comprise: determining whether the first gateway instance is down; and upon determining that the first gateway instance is down, rerouting the traffic from the multiple VMs to a second gateway instance in the gateway cluster.

Clause 17. A computer-readable storage medium storing computer-readable instructions executable by one or more processors, that when executed by the one or more processors, cause the one or more processors to perform operations comprising: receiving traffic from multiple virtual machines (VMs) associated with a same identification (ID); mapping the ID into a destination Internet Protocol (IP) address; and forwarding the traffic from the multiple VMs to a first gateway instance announcing the destination IP address.

Clause 18. The computer-readable storage medium of clause 17, wherein before forwarding the traffic from the multiple VMs to a first gateway instance, the operations further comprise encapsulating the traffic from the multiple VMs using the destination IP address.

Clause 19. The computer-readable storage medium of clause 17, the operations further comprise: monitoring the traffic from the multiple VMs by determining whether a traffic indicator exceeds a threshold; and upon determining that the traffic indicator exceeds the threshold, throttling the traffic from the multiple VMs.

Clause 20. The computer-readable storage medium of clause 17, wherein the traffic indicator indicates a bandwidth occupied by the traffic of the multiple VMs.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
receiving traffic from multiple virtual machines (VMs) associated with a same user identification (ID);
mapping the user ID into a destination Internet Protocol (IP) address;
forwarding the traffic from the multiple VMs associated with the same user ID to a same first gateway instance announcing the destination IP address;
monitoring, by the first gateway instance, the traffic from the multiple VMs with the same user ID by determining whether a traffic indicator exceeds a threshold; and
upon determining that the traffic indicator exceeds the threshold, throttling, by the first gateway instance, the traffic from the multiple VMs with the same user ID.

2. The method of claim 1, wherein before forwarding the traffic from the multiple VMs to the first gateway instance, the method further comprises encapsulating the traffic from the multiple VMs using the destination IP address.

3. The method of claim 1, wherein the traffic indicator indicates a bandwidth occupied by the traffic of the multiple VMs.

4. The method of claim 1, wherein the traffic indicator indicates a dataflow of the multiple VMs.

5. The method of claim 1, wherein mapping the user ID into the destination IP address includes hashing the user ID into a whole IP address range of a gateway cluster, the gateway cluster including the first gateway instance.

6. The method of claim 5, wherein the whole IP address range includes a plurality of IP address sub-ranges, the gateway cluster including a plurality of gateway instances, each gateway instance of the plurality of gateway instances announcing an IP sub-range of the plurality of IP address sub-ranges.

7. The method of claim 6, further comprising:
determining whether the first gateway instance is down; and
upon determining that the first gateway instance is down, rerouting the traffic from the multiple VMs to a second gateway instance in the gateway cluster.

8. An apparatus, comprising:
one or more processors;
a memory coupled to the one or more processors, the memory storing computer-readable instructions executable by the one or more processors, that when executed by the one or more processors, cause the one or more processors to perform operations including:
receiving traffic from multiple virtual machines (VMs) associated with a user same identification (ID);
mapping the user ID into a destination Internet Protocol (IP) address;
forwarding the traffic from the multiple VMs associated with the same user ID to a same first gateway instance announcing the destination IP address,
monitoring, by the first gateway instance, the traffic from the multiple VMs with the same user ID by determining whether a traffic indicator exceeds a threshold; and
upon determining that the traffic indicator exceeds the threshold, throttling, by the first gateway instance, the traffic from the multiple VMs with the same user ID.

9. The apparatus of claim 8, wherein before forwarding the traffic from the multiple VMs to the first gateway instance, the operations further comprise encapsulating the traffic from the multiple VMs using the destination IP address.

10. The apparatus of claim 8, wherein the traffic indicator indicates a bandwidth occupied by the traffic of the multiple VMs.

11. The apparatus of claim 8, wherein the traffic indicator indicates a dataflow of the multiple VMs.

12. The apparatus of claim 8, wherein mapping the user ID into the destination IP address includes hashing the user ID into a whole IP address range of a gateway cluster, the gateway cluster including the first gateway instance.

13. The apparatus of claim 12, wherein the whole IP address range includes a plurality of IP address sub-ranges, the gateway cluster including a plurality of gateway instances, each gateway instance of the plurality of gateway instances announcing an IP sub-range of the plurality of IP address sub-ranges.

14. The apparatus of claim 13, wherein the operations further comprise:
determining whether the first gateway instance is down; and
upon determining that the first gateway instance is down, rerouting the traffic from the multiple VMs to a second gateway instance in the gateway cluster.

15. A computer-readable storage medium storing computer-readable instructions executable by one or more processors, that when executed by the one or more processors, cause the one or more processors to perform operations comprising:
receiving traffic from multiple virtual machines (VMs) associated with a same user identification (ID);
mapping the user ID into a destination Internet Protocol (IP) address;
forwarding the traffic from the multiple VMs associated with the same user ID to a same first gateway instance announcing the destination IP address,
monitoring, by the first gateway instance, the traffic from the multiple VMs with the same user ID by determining whether a traffic indicator exceeds a threshold; and
upon determining that the traffic indicator exceeds the threshold, throttling, by the first gateway instance, the traffic from the multiple VMs with the same user ID.

16. The computer-readable storage medium of claim 15, wherein before forwarding the traffic from the multiple VMs to the first gateway instance, the operations further comprise encapsulating the traffic from the multiple VMs using the destination IP address.

17. The computer-readable storage medium of claim 15, wherein the traffic indicator indicates a bandwidth occupied by the traffic of the multiple VMs.

* * * * *